United States Patent

Goldberg et al.

Patent Number: 6,125,175
Date of Patent: Sep. 26, 2000

[54] METHOD AND APPARATUS FOR INSERTING BACKGROUND SOUND IN A TELEPHONE CALL

[75] Inventors: Randy G. Goldberg, Princeton; Kenneth H. Rosen; Richard M. Sachs, both of Middletown, all of N.J.

[73] Assignee: AT&T Corporation, New York, N.Y.

[21] Appl. No.: 08/933,495

[22] Filed: Sep. 18, 1997

[51] Int. Cl.[7] .................................................. H04M 3/42
[52] U.S. Cl. ........................ 379/207; 379/69; 379/88.28
[58] Field of Search .............................. 379/67.1, 69, 70, 379/74, 88.28, 201, 207, 214, 219

[56] References Cited

U.S. PATENT DOCUMENTS

| | | | |
|---|---|---|---|
| 5,189,692 | 2/1993 | Ferrara | 379/214 X |
| 5,422,937 | 6/1995 | Ferrara | 379/214 X |

*Primary Examiner*—Harry S. Hong
*Attorney, Agent, or Firm*—Kenyon & Kenyon

[57] ABSTRACT

A system inserts one or more background sounds in a telephone call between a calling party and a called party. The system includes a network node coupled to a first telephone used by the calling party and a second telephone used by the called party. The network node is further coupled to an audio source. One or more background sounds are stored on the audio source. The calling party dials into the network node. The network node presents a menu of background sounds to the calling party who selects at least one background sound. The calling party then enters the phone number of the called party. The network node initiates the telephone call to the called party over a first telephone channel, and then inserts the selected background sound retrieved from the audio source onto the telephone channel. If a multi-party call is requested by the calling party, the calling party can select different background sounds that are inserted by the network node onto the telephone channel for each called party.

25 Claims, 4 Drawing Sheets

METHOD AND APPARATUS FOR INSERTING BACKGROUND SOUND IN A TELEPHONE CALL

FIELD OF THE INVENTION

The present invention is directed to a telephone network. More specifically, the present invention is directed to a telephone network that inserts background sound in a telephone call.

BACKGROUND OF THE INVENTION

In an ordinary telephone call between two callers, the sound heard in the background of the call reflects the locale of each caller. For example, if a calling party is calling from a telephone in a tavern or bar, the sounds emanating from the bar (e.g., clinking glasses, music, loud talking) will likely be heard as a background sound by the called party. However, if a calling party is calling from a quiet room, the called party will typically not hear any background sound.

For various reasons, a calling party might desire to insert background sound in a telephone call that is not actually generated by the locale of the calling party. For example, a calling party who is calling from a quiet room might wish to make the recipient of the call believe that the calling party is calling from a tavern or bar. One way to do this is to insert background sound into the telephone call that is similar to the sounds emanating from such a location.

One way to insert background sounds is for the calling party to have a source of background sounds playing in the mouthpiece of the telephone, or integrated into the telephone. However, this requires the calling party to purchase or create pre-recorded background sounds, and to have the sounds available when the call is initiated. Further, the calling party must have the expertise to enable the sounds to be played continuously during the entire telephone call. In addition, if the calling party is involved in a multi-party call, the calling party may desire that each called party hear a different background sound. This is not possible if the source of the background sound originates from the calling party's phone.

Further, a called party may desire to have a background sound inserted in all received calls, or in preselected received calls. This is difficult if the called party must be the source of the background sound.

Based on the foregoing, there is a need for a method and apparatus for inserting background sound in a telephone call that does not require the calling party or called party to purchase or create the background sounds and that enables multiple called parties to hear different background sounds.

SUMMARY OF THE INVENTION

One embodiment of the present invention is a system for inserting one or more background sounds in a telephone call between a calling party and a called party. The system includes a network node coupled to a first telephone used by the calling party and a second telephone used by the called party. The network node is further coupled to an audio source. One or more background sounds are stored on the audio source.

The calling party dials into the network node. The network node presents a menu of background sounds to the calling party who selects at least one background sound. The calling party then enters the phone number of the called party. The network node initiates the telephone call to the called party over a first telephone channel, and inserts the selected background sound retrieved from the audio source onto the telephone channel. If a multi-party call is requested by the calling party, the calling party can select different background sounds that are inserted by the network node onto the telephone channel for each called party.

DETAILED DESCRIPTION

Figure 1:
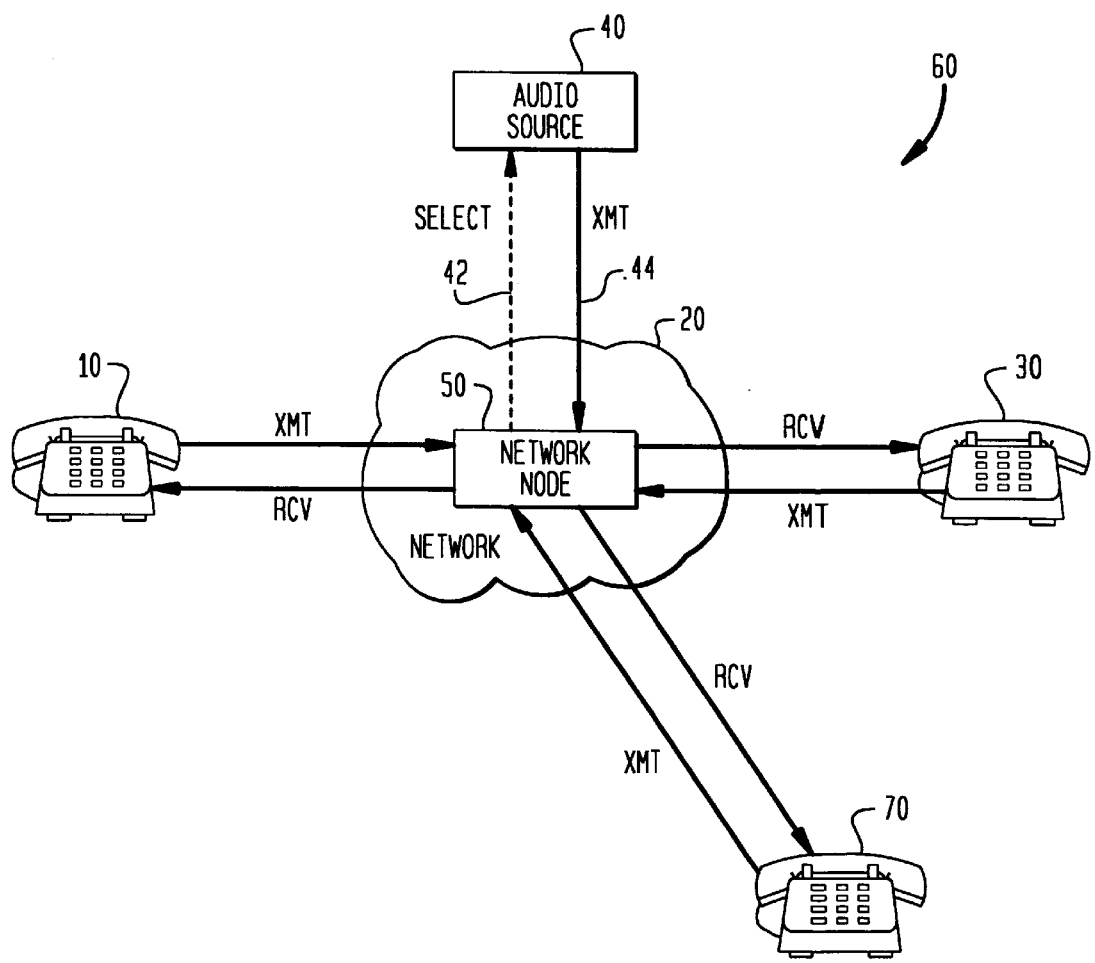
FIG. 1 illustrates an exemplary system that includes one embodiment of the present invention.

The present invention inserts background sound in a telephone call. FIG. 1 illustrates an exemplary system that includes one embodiment of the present invention. In the system 60 shown in FIG. 1, a calling party initiates a telephone call by using a telephone 10. A called party receives the telephone call using a telephone 30. An additional called party in a multi-party call receives the call using a telephone 70.

Phones 10, 30 and 70 are each coupled to a network node 50 within a network 20 via a transmit and receive telephone channel. Network 20 can be any network that enables the calling party to initiate and complete the telephone call to the called party. For example, in one embodiment of the present invention network 20 is the Public Switched Telephone Network ("PSTN"). Other examples of network 20 include a local area network, the Internet, or an Intranet.

Network node 50 is one of the nodes within network 20 that a telephone call between phone 10, phone 30 and phone 70 passes through. In one embodiment of the present invention, node 50 is the PSTN switch local to phone 10. In another embodiment, node 50 is a computer server, or a computer server coupled to a PSTN switch.

An audio source 40 is also coupled to network node 50 through network 20. In one embodiment, audio source 40 is a general purpose computer coupled to a storage device that stores a variety of background sounds as digital files that can be inserted into a telephone call. Examples of background sounds include restaurant sounds, forest sounds, beach sounds, city traffic sounds, etc. The background sounds can also be received by audio source 40 from an external source. For example, audio source 40 can receive live audio broadcasts that can be inserted as background sound in a telephone call.

Audio source 40 is coupled to network node 50 through a transmit channel 44 and a select line 42. Transmit channel 44 transmits the background sound from audio source 40 to network node 50. Audio source 40 can also be coupled to network node 50 through a plurality of transmit channels. In this embodiment, each transmit channel is capable of transmitting simultaneously the same, or different background sounds to network node 50. These background sounds can be simultaneously inserted in a plurality of individual telephone calls.

Select line 42 carries select signals from network node 50. The select signals select which background sound or sounds audio source 40 should transmit to network node 50. Audio source 40 can either be located outside network 20 as shown in FIG. 1 or inside network 20.

Figure 2:
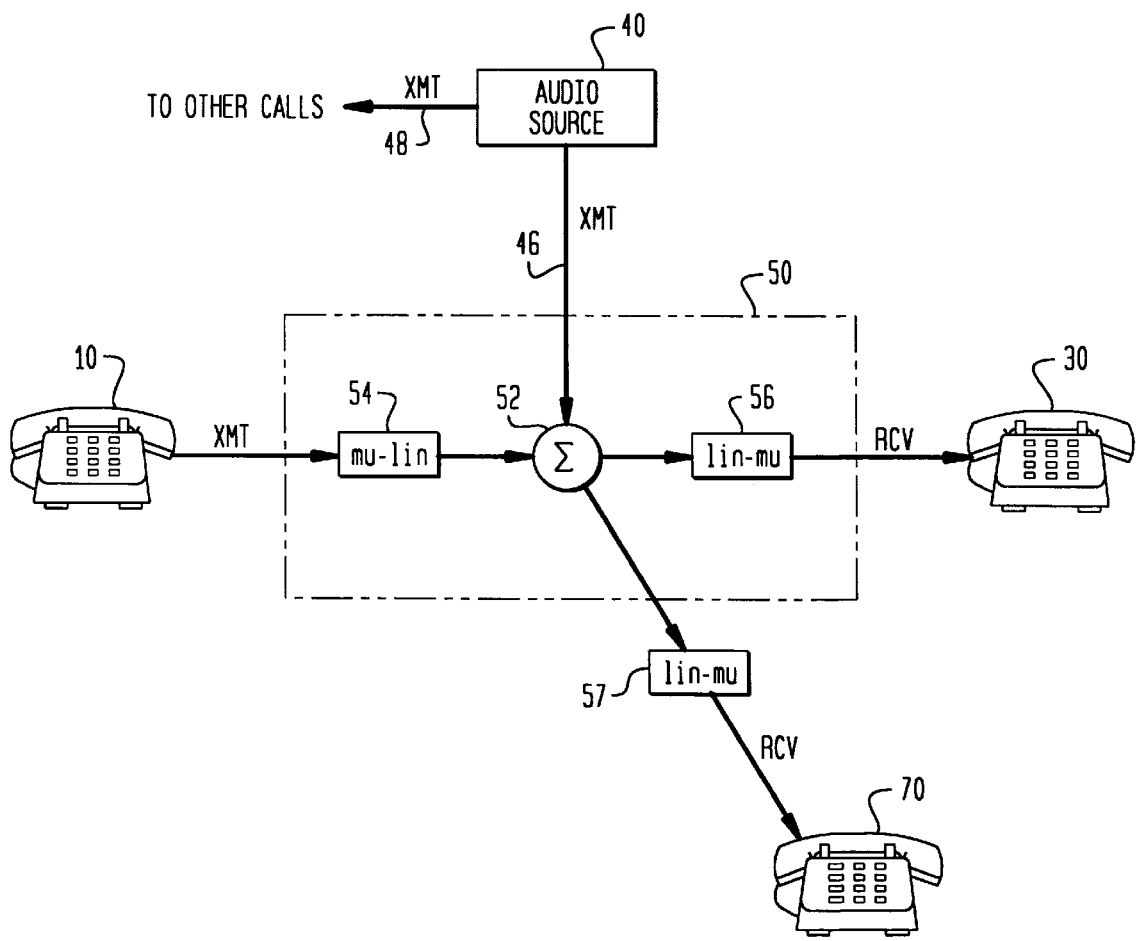
FIG. 2 illustrates in more detail a network node in accordance with one embodiment of the present invention.

Audio source 40 is programmed to transmit one or more background sounds to network node 50 when requested via select line 42. Network node 50 then inserts the background sounds in a telephone call. FIG. 2 is a block diagram illustrating in more detail network node 50 in accordance with one embodiment of the present invention. FIG. 2 illustrates how the background sound can be inserted in a telephone call from a calling party on phone 10 to a called party on phone 30, or in a multi-party telephone call from a calling party on phone 10 to called parties on phones 30 and 70. FIG. 2 further illustrates how network node 50 can insert background sounds in more than one telephone call at a time.

In FIG. 2, network node 50 receives a background sound from audio source 40 over transmit channel 46. The background sound is input to a summation device 52. Also input to summation device 52 is the voice signal on the transmit channel of phone 10 after it is converted in a µ-law/linear converter 54. The µ-law/linear converter 54 converts the voice signal on the transmit channel of phone 10 that has been digitized using µ-law coding to a linear coded voice signal in order to allow background sound to be summed with the voice signal. Summation device 52 adds the background sound from transmit channel 46 to the output of µ-law/linear converter 54. The resultant signal is converted back to µ-law by a linear/µ-law converter 56 and then received by phone 30 on its receive channel.

Multiple individual telephone calls can receive background sounds from audio source 40 simultaneously. For example, in FIG. 2 the telephone call between phones 10 and 30 receives a background sound from transmit channel 46. Another telephone call between other phones (not shown in FIG. 2) can simultaneously receive the same, or a different background sound from a transmit channel 48. This background sound is inserted by network node 50 into the telephone call in the same manner as previously described.

Further, during a multi-party call the same background sound heard on phone 30 can also be heard on phone 70. The resultant signal output from summation device 52 is converted in a linear/µ-law converter 57 and then received by phone 70 on its receive channel.

Figure 3:
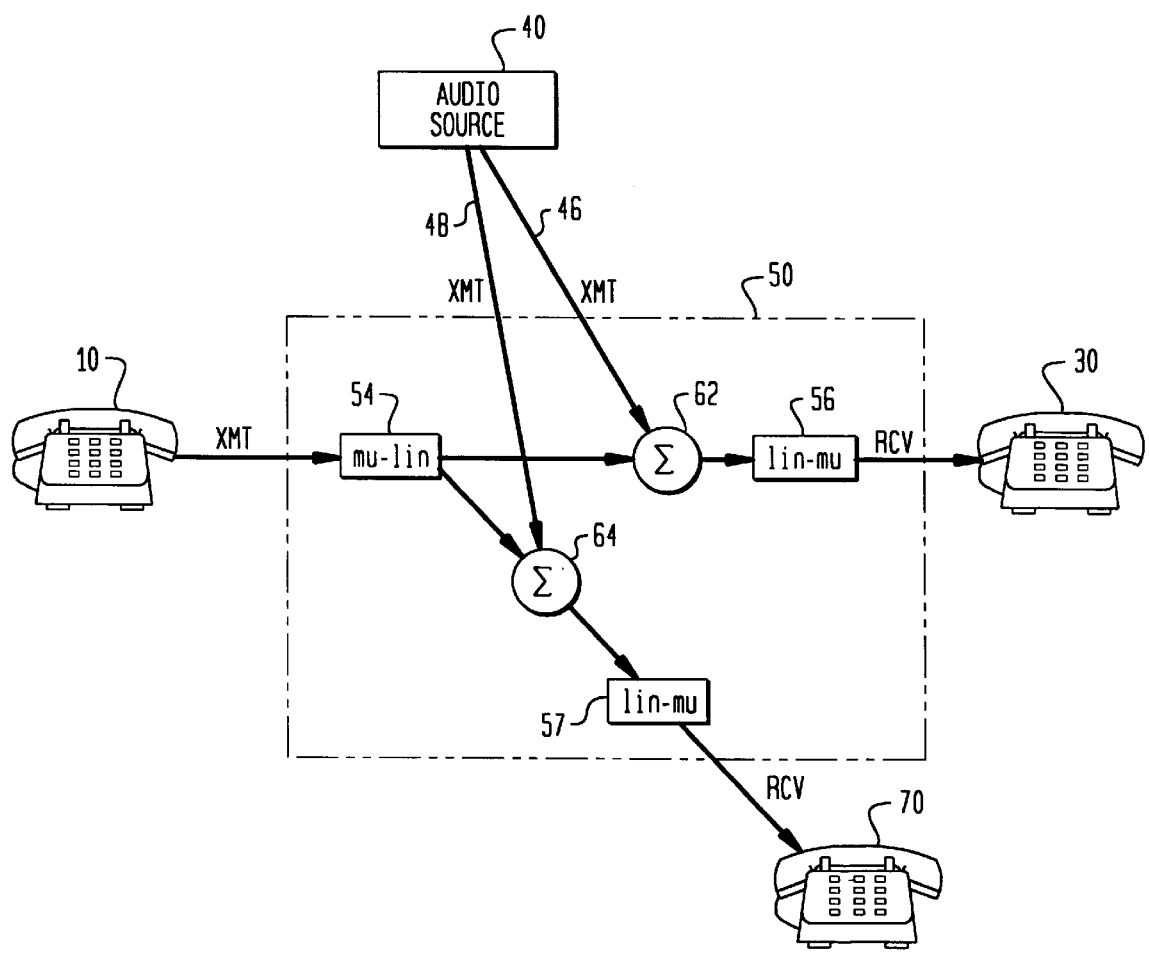
FIG. 3 illustrates one embodiment of a network node for providing different background sounds to different called parties in a multi-party call.

In addition, during a multi-party call a different background sound can be inserted into each called party's receive channel. For example, one called party can hear restaurant background sounds while another called party can hear traffic sounds during the multi-party call. FIG. 3 illustrates one embodiment of network node 50 for providing different background sounds to different called parties in a multi-party call.

The multi-party call in FIG. 3 is between a calling party at phone 10 and called parties at phones 30 and 70. The voice signal on the transmit channel of phone 10 is converted in µ-law/linear converter 54. The voice signal then is sent to separate summing devices 62 and 64. Summing device 62 inserts the first background sound received on transmit channel 46 to the voice call and converts the resultant signal in a linear/µ-law converter 56. The signal is received by phone 30 on its receive channel. Similarly, a second background sound is received on transmit channel 48, summed at summing device 64 and received by phone 70.

In one embodiment of the present invention, only the called parties can hear the background sound. In another embodiment, both the calling party and the called parties can hear the background sound when only one background sound is selected for all called parties.

Figure 4:
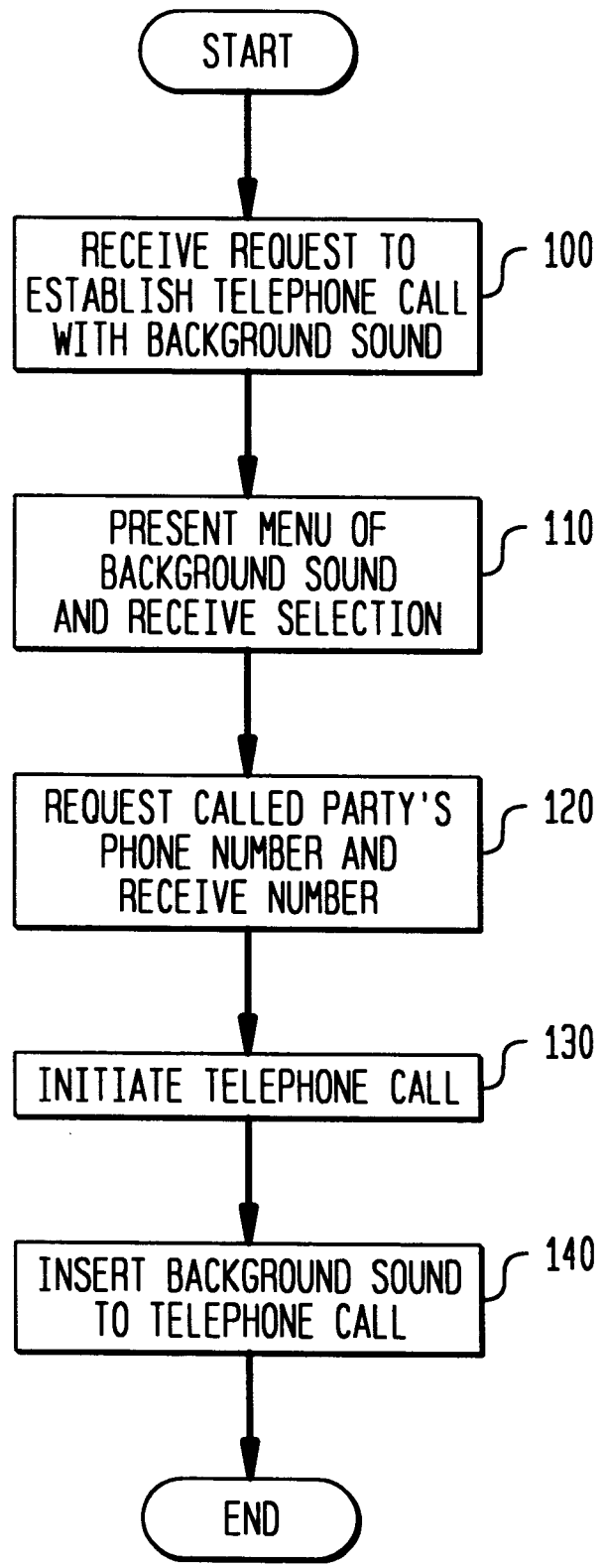
FIG. 4 is a flowchart illustrating the steps performed by a network node in one embodiment of the present invention when a call is initiated by a calling party.

FIG. 4 is a flowchart illustrating the steps performed by network node 50 in one embodiment of the present invention when a call is initiated by a calling party on phone 10. When the calling party desires to use the system to insert background sound, the calling party initiates the call by dialing a phone number associated with network node 50.

At step 100, network node 50, as a result of the calling party initiating the call, receives a request to establish a telephone call with an inserted background sound from phone 10.

At step 110, network node 50 presents a menu of available background sounds that can be inserted in the telephone call to the calling party at phone 10. The list of available background sounds coincides with the stored background sound files on audio source 40. The menu can be, for example, a list of choices that are selectable by touch-tone or speech recognition. The calling party can then select a background sound, or background sounds for a multi-party call, from the list. Network node 50 then receives the choice of background sounds from the calling party.

At step 120, network node 50 asks the calling party for the phone number of the called party at phone 30, and the phone number of the called party at phone 70 if a multi-party call is desired. The phone number is then entered by the calling party using, for example, touch-tone or speech recognition.

At step 130, network node 50 initiates the telephone call to phone 30 and any other requested phones in a known manner.

When the phone call is answered by the called party or parties, at step 140 the selected background sounds are inserted. The background sounds are inserted by network node 50 into the receive channels of each called party as previously described in conjunction with FIGS. 2 and 3.

In the embodiments shown in FIGS. 2 and 3, network node 50 does not require a special processor to insert background sounds received from audio source 40. However, in other embodiments, network node 50 includes a processor dedicated to each telephone call in which background sound is inserted. The processors are programmed to enable the calling party to select additional functionality. For example, the calling party can select the volume level of the inserted background sounds.

Further, the background sounds, instead of being inserted when the telephone call is initiated, can be inserted at a specific time frame. One example of this is a background sound that simulates a door bell. The calling party may wish this background sound to be inserted at a point in the telephone call where the calling party needs an excuse to hang up on the called parties. The processor dedicated to the call can listen for the calling party to press a specific number on the telephone keypad, or listen, using voice recognition, for the calling party to say a specific word or words. The processor can then insert the background sound. Background sounds can be turned on or off throughout a telephone call in a similar manner.

As described, the telephone network in accordance with the present invention inserts a choice of background sounds in the network. Therefore, the caller that desires background sounds does not have to provide the sounds or insert them into the telephone call. Further, in a multi-party call, each called party can hear a different background sound.

Several embodiments of the present invention are specifically illustrated and/or described herein. However, it will be appreciated that modifications and variations of the present invention are covered by the above teachings and within the purview of the appended claims without departing from the spirit and intended scope of the invention.

For example, in an alternative embodiment, a code or identifier can be preassigned to each background sound. The code can be entered by the calling party after the initial call setup. Therefore, a menu of background sounds does not need to be presented to the calling party.

Further, the present invention is not limited to only the calling party requesting that background sounds be inserted during a telephone call. For example, network node 50 can be a called party's local switch. The called party can request the network node 50 (in advance of calls or during a call) to insert a background sound into all incoming calls, or into preselected incoming calls based on automatic number identification ("ANI"). Therefore, a calling party during a telephone call to the called party will hear the background sound during the telephone call.

What is claimed is:

1. A method of establishing a telephone call between a calling party and a first called party through a network, said method comprising the steps of:

receiving a request to establish the telephone call from the calling party;

receiving a selection of a first background sound from the calling party;

initiating the telephone call to the first called party over a first telephone channel; and inserting the first background sound output from an audio source onto the first telephone channel.

2. The method of claim 1, further comprising the step of:

presenting a menu of one or more background sounds to the calling party.

3. The method of claim 1, wherein the telephone call is further between a second called party, said method comprising the steps of:

receiving a selection of a second background sound from the calling party;

initiating the telephone call to the second called party over a second telephone channel; and inserting the second background sound output from the audio source onto the second telephone channel.

4. The method of claim 1, wherein said step of inserting the first background sound comprises the step of:

summing the first background sound with a digitized voice signal received from the calling party.

5. The method of claim 4, wherein said step of inserting the first background sound comprises the step of:

converting the digitized voice signal from $\mu$-law to linear.

6. The method of claim 1, wherein the network is a Public Switched Telephone Network.

7. The method of claim 1, wherein the background sounds comprise restaurant sounds, forest sounds, and city traffic sounds.

8. A system for inserting one or more background sounds in a telephone call between a first telephone and a second telephone, said system comprising:

a network node coupled to the first and second telephone;

an audio source coupled to a network node, said audio source having stored thereon the one or more background sounds;

receiving a selection of a first background sound from the first telephone;

initiating the telephone call to the second telephone over a first telephone channel; and inserting the first background sound received from said audio source onto the first telephone channel.

9. The system of claim 8, said network node comprising:

a summing device;

a $\mu$-law/linear converter; and a linear/$\mu$-law converter.

10. The system of claim 8, wherein the telephone call is further between a third telephone, and wherein said network node is programmed to execute the steps of:

receiving a selection of a second background sound from the first telephone;

initiating the telephone call to the third telephone over a second telephone channel; and inserting the second background sound received from said audio source onto the second telephone channel.

11. The system of claim 8, wherein said network node is a switch within a network.

12. The system of claim 11, wherein said network is a Public Switched Telephone Network.

13. The system of claim 11, wherein said audio source is coupled to said network node via a transmit channel.

14. A method of operating a network node, wherein the network node is coupled to an audio source having stored thereon a plurality of background sounds, said method comprising the steps of:

receiving a request from a calling party to establish a telephone call, wherein the requested telephone call is to a first called party;

receiving an identity of a first one of the background sounds from the calling party;

initiating the telephone call by establishing a first telephone channel between the calling party and the called party; and inserting the first background sound onto the first telephone channel.

15. The method of claim 14, wherein the requested telephone call is further to a second called party, and wherein said step of Initiating comprises the step of establishing a second telephone channel between the calling party and the second called party, said method further comprising the steps of:

receiving an identity of a second one of the background sounds; and inserting the second background sound on the second telephone channel.

16. The method of claim 14, further comprising the step of:

presenting a menu of the plurality of background sounds to the calling party.

17. The method of claim 14, wherein said step of inserting the first background sound comprises the step of:

summing the background sound with a digitized voice signal received from the calling party.

18. The method of claim 17, wherein said step of inserting the first background sound comprises the step of:

converting the digitized voice signal from $\mu$-law to linear.

19. The method of claim 14, wherein the plurality of background sounds comprise live audio.

20. A method of inserting a background sound during a telephone call between a plurality of parties, said method comprising the steps of:

receiving a signal from a first party selecting the background sound;

detecting at a network node a call to the first party at a first location from a second party at a second location, the network node being at a location distinct from each of the first location and the second location, requesting the background sound from an audio source; and summing the background sound with a digitized speech signal received from the first party.

21. The method of claim 20, wherein the signal is a touch-tone.

22. The method of claim 20, wherein the signal is a portion of the digitized speech signal.

23. A method of inserting a background sound in a telephone call between a calling party at a first location and a called party at a second location, said method comprising the steps of:

storing a background sound identifier in a network node local to the called party;

detecting at the network node the telephone call to the called party at the second location from the calling party at the first location, the network node being at a location distinct from each of the first location and the second location;

receiving the background sound from an audio source; and inserting the background sound in the telephone call.

24. The method of claim 23, wherein the called party stores the background sound identifier.

25. The method of claim 23, wherein said step of receiving the background sound is in response to receiving an automatic number identification.

\* \* \* \* \*